No. 757,029. PATENTED APR. 12, 1904.
F. EGGE.
MACHINE FOR MAKING SHEET METAL CHAIN.
APPLICATION FILED FEB. 24, 1903.
NO MODEL. 4 SHEETS—SHEET 1.

WITNESSES:
H. A. Lamb
M. J. Sougden

INVENTOR
F. Egge
BY
ATTORNEY

No. 757,029. PATENTED APR. 12, 1904.
F. EGGE.
MACHINE FOR MAKING SHEET METAL CHAIN
APPLICATION FILED FEB. 24, 1903.
NO MODEL. 4 SHEETS—SHEET 3.
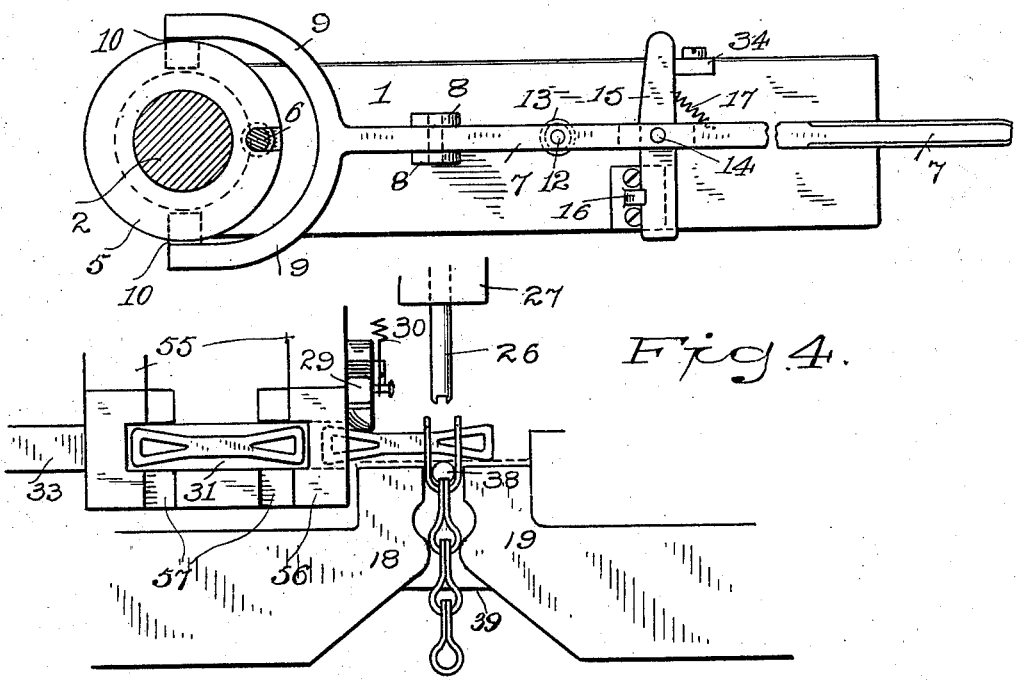
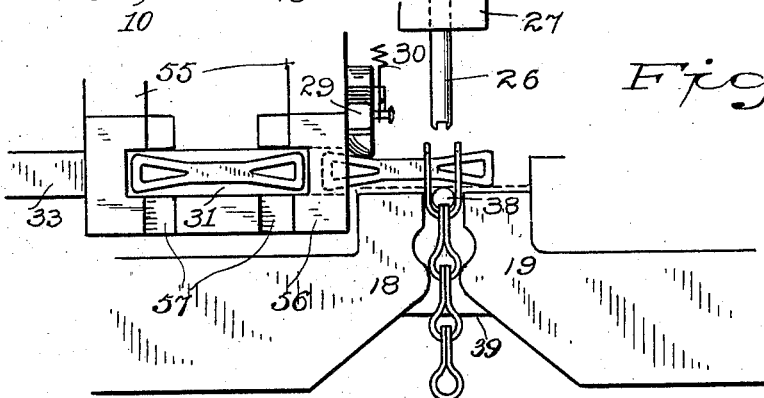
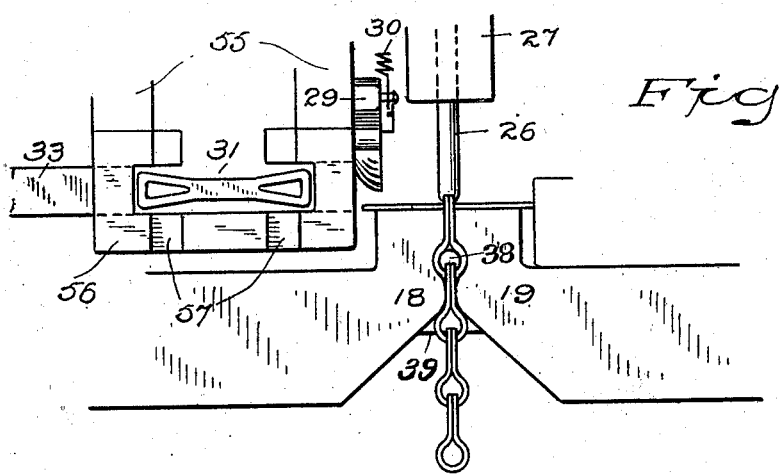
WITNESSES:
H. A. Lamb
M. T. Lougden
INVENTOR
F. Egge
BY
ATTORNEY No. 757,029. PATENTED APR. 12, 1904.
F. EGGE.
MACHINE FOR MAKING SHEET METAL CHAIN.
APPLICATION FILED FEB. 24, 1903.
NO MODEL. 4 SHEETS—SHEET 4.

WITNESSES:
H. A. Lamb
M. J. Lungden

INVENTOR
F. Egge
BY
ATTORNEY

No. 757,029.         Patented April 12, 1904.

UNITED STATES PATENT OFFICE.

FREDERICK EGGE, OF BRIDGEPORT, CONNECTICUT, ASSIGNOR TO THE SMITH & EGGE MANUFACTURING COMPANY, OF BRIDGEPORT, CONNECTICUT, A CORPORATION OF CONNECTICUT.

MACHINE FOR MAKING SHEET-METAL CHAIN.

SPECIFICATION forming part of Letters Patent No. 757,029, dated April 12, 1904.

Application filed February 24, 1903. Serial No. 144,851. (No model.)

*To all whom it may concern:*

Be it known that I, FREDERICK EGGE, a citizen of the United States, residing at Bridgeport, in the county of Fairfield and State of Connecticut, have invented certain new and useful Improvements in Machines for Automatically Manufacturing Sheet-Metal Chain; and I do hereby declare the following to be a full, clear, and exact description of the invention, such as will enable others skilled in the art to which it appertains to make and use the same.

My invention relates to certain improvements in machines for automatically manufacturing sheet-metal chain from blanks that have been previously cut out on a separate machine and which are automatically fed from stacks to the instrumentalities which I employ in the present improvement for interlinking them with partially-formed links, and finally shaping and properly upsetting said links.

The object of my improvement is to provide a machine for doing this work in a very simple and effective manner, while at the same time the operation of said machine is exceedingly rapid, and any mishap is the direct cause of bringing the machine to an immediate stop, so that no damage can be done.

With these ends in view my invention consists in certain details of construction and combination of parts, such as will be hereinafter fully set forth and then specifically be designated by the claims.

Figure 1:
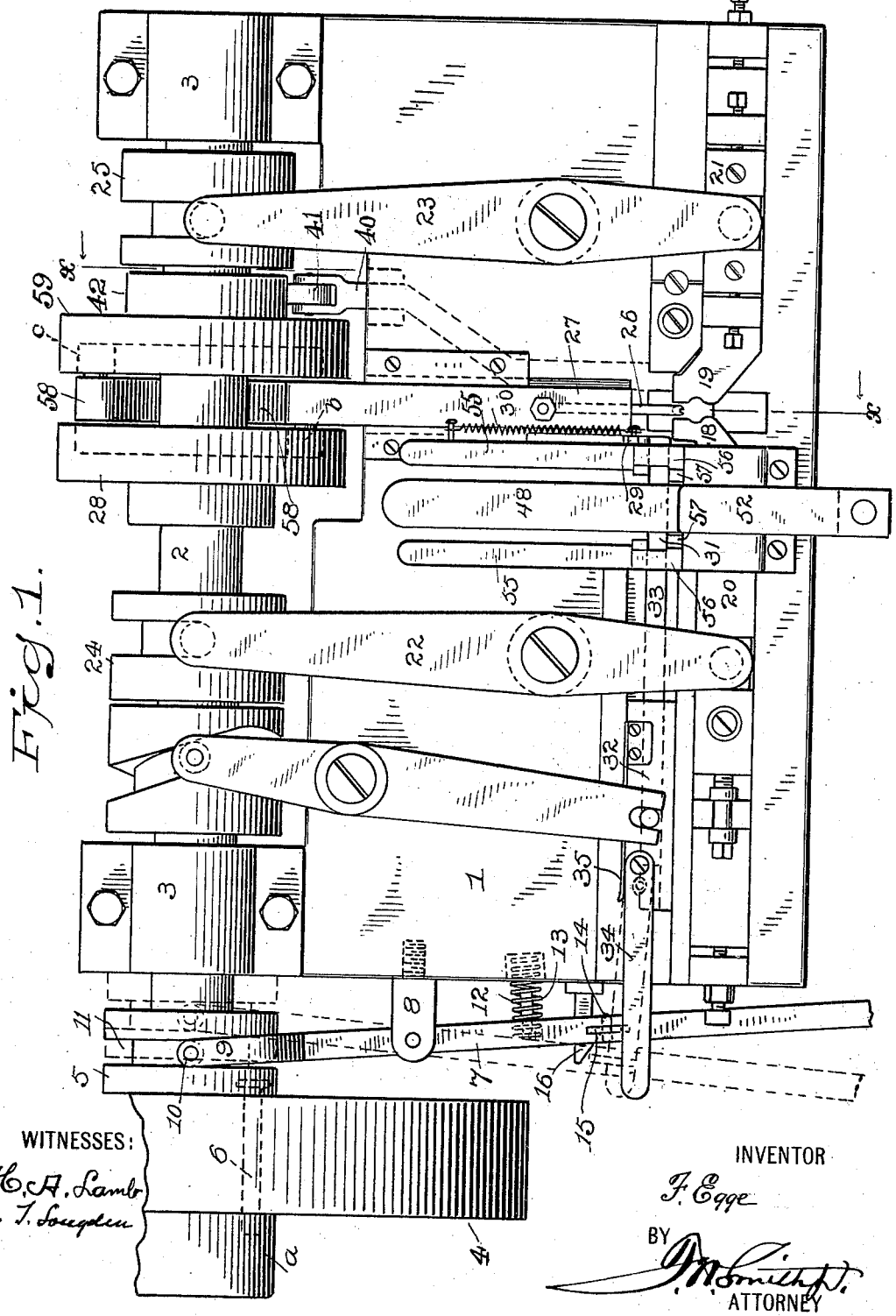
Figure 2:
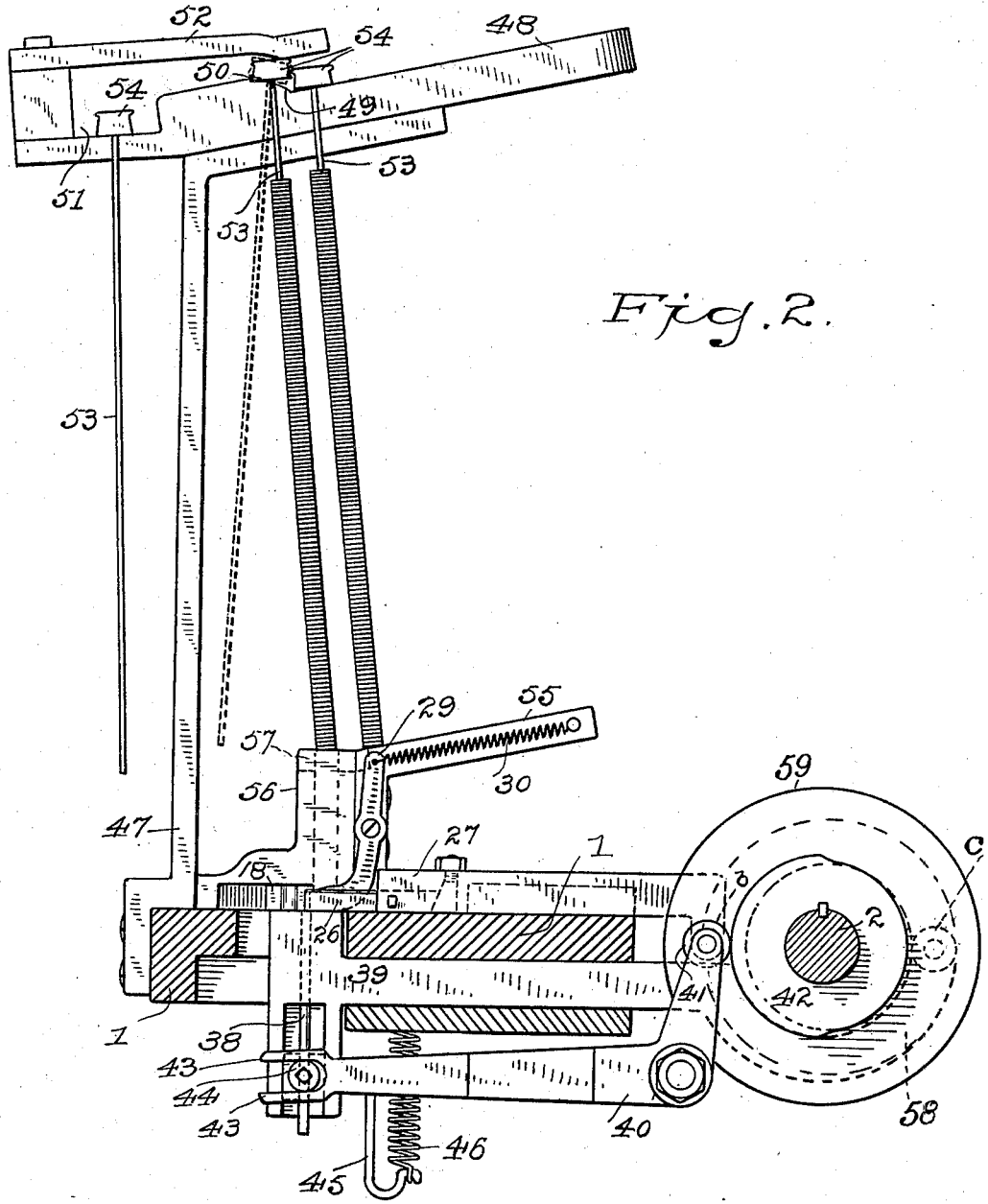
Figure 6:
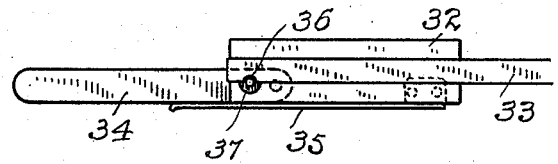
Figure 7:
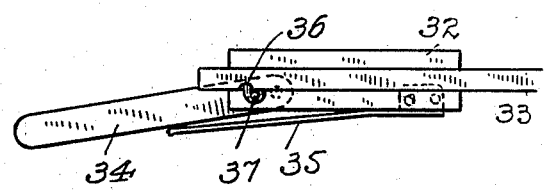
Figure 8:
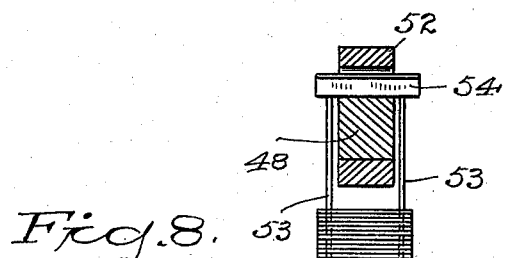

In the accompanying drawings, which form a part of this application, Figure 1 is a plan view illustrating my improved machine; Fig. 2, a section at the line *x x* of Fig. 1; Fig. 3, an end elevation of my machine, the main shaft being shown in section; Fig. 4, a detail view, on an enlarged scale, showing the parts that are directly instrumental in the manufacture of the chain, said parts being in the position which they assume at the time when a blank is being threaded through the eyes of a previously-bent link. Fig. 5 is a view similar to Fig. 4 and showing the parts in the position which they assume after a blank has been completely threaded through the eyes of a previously-bent link and after said link has been forced between the shaping-dies; Fig. 6, a detail bottom view of the feed-block, feed-finger, and trip-lever in their normal relative positions; Fig. 7, a similar view showing the relative positions which said parts assume when the feed-finger meets with an obstruction, and Fig. 8 is a detail front elevation showing a stack of blanks held in proper position relative to the block which contains the feed-well.

Similar characters of reference denote like parts in the several figures of the drawings.

The means which I employ for imparting the proper motions at the proper times to the devices for feeding the blanks through the eyes of the previously-bent links to the push-finger, which effects the bending of a flat blank into U shape to the closing-in or shaping dies, which impart the proper shape to the link and to the mandrel-pin, which effects the "upsetting" of the link and operates to bring the U-shaped link into proper position for the operation of the closing-in dies, are quite ordinary, consisting of cams, cam-levers, &c., and really do not constitute any part of my invention, and I will therefore not enter into any detail description of the same, since their operation and function will be readily understood.

The main points upon which I rely for novelty in my improved machine are, first, the peculiar construction and operation of the feed-finger, which pushes a blank through the eyes of a previously-bent link; second, the particular devices which I employ for positively causing a flat blank to assume a position with its side edges in a vertical plane after it has been threaded through the eyes of a previously-bent link; third, the operation and function of what I shall hereinafter term the "four-motion mandrel-pin;" fourth, the operation and function of the push-finger, which effects the primary bending of the links into U shape; fifth, the devices which I employ for automatically delivering the blanks in stacked form, so that they can be successively pushed by the feed-finger through the eyes of previously-bent links.

1 is the bed of my improved machine; 2, the power-shaft, journaled at the rear edge thereof in suitable bearings 3; 4, the power-pulley, and 5 the clutch-pulley, loosely mounted on the shaft 2, and 6 is an ordinary clutch-pin extending from the pulley 5 through the pulley 4 and adapted to engage with a suitable recess (not shown) in a collar $a$, rigid on the shaft. The two pulleys 4 5 are thus connected by means of the pin 6, so that they will always revolve in harmony, and the pulley 5 is capable of a free longitudinal movement on the shaft, so that it will be readily understood that when the pulley 5 is moved away from the pulley 4 the clutch-pin 6 will be disengaged from the collar $a$ and the power-shaft will cease to revolve, while the movement of the pulley 5 toward the pulley 4 will cause said pin to engage with the recess in said collar, whereby revolution may be imparted to the power-shaft. This form of clutch is very ordinary and constitutes no part of my invention.

7 is an ordinary clutch-lever pivoted between a pair of ears 8, extending from the bed and having one end forked, as shown at 9, said fork being provided with rolls 10, which extend within a groove 11 in the clutch-pulley. Intermediate of the other end of this lever and the pivotal point thereof is a pin 12, which extends from said lever toward the bed-plate, and around this pin is a coil-spring 13, one end of which is within a recess in the bed-plate, as shown in dotted lines in Fig. 1, while the other end bears against the lever itself, the function of this spring being to normally throw the clutch-pulley out of engagement with the collar $a$.

Pivoted at 14 to the lever 7 is a latch-lever 15, which when the clutch-pulley 5 is engaged with the collar $a$ is normally kept in engagement with a hook 16, extending from the bed-plate, by means of a coil-spring 17, whose ends are secured, respectively, to the lever 7 and to the upper portion of this latch-lever, the function of the latch-lever being, of course, to preserve the engagement between the clutch and power pulleys and the collar $a$ against the resiliency of the coil-spring 13.

18 19 are the shaping-dies, secured in any suitable manner to blocks 20 21, which latter are adapted to slide freely within ways in the bed-plate. The proper sliding movements of these blocks are imparted by means of levers 22 23, pivoted to the bed-plate of the machine, the rear ends of said levers having depending therefrom suitable rolls (not shown) which engage cams 24 25, carried by the power-shaft, while the front ends of said levers are pivoted in any suitable manner to the blocks 20 21.

26 is a push-finger secured to a carriage 27, which latter is adapted to slide freely within suitable ways in the bed, and is provided near its rear end with an ordinary roll $b$, (shown in dotted lines,) which engages with a cam 28, carried by the power-shaft, the function of this cam being, of course, to impart to the push-finger the proper reciprocatory movements, as will be hereinafter more fully set forth.

29 is a dog pivoted at or about its central portion to a stationary part of the machine, the lower or nose end of said dog being beveled and normally projected within the feedway for the link-blanks, this position being maintained by means of the coil-spring 30, whose ends are secured, respectively, to the upper or tail end of the dog and to a stationary part of the machine.

31 is the well into which the link-blanks are delivered, the bottom of said well constituting a part of the general feedway throughout which a suitable feed-finger operates to push the link-blanks successively into position for the proper bending and shaping into the form of completed links.

Capable of sliding within suitable ways in the bed is the feed-block 32, and within suitable ways throughout the bottom of the block is the feed-finger 33, which is capable of sliding within these ways in the block.

34 is a trip-lever pivoted at its inner end upon the upper face of the block 32, and 35 is a flat spring secured to said block and having its free end extending against the side of the lever 34, so as to keep the latter normally parallel to said block. The outer end of this lever 34 in its normal position extends immediately in front of the upper end of the latch-lever 15, and it will be clear that when the lever 34 is thrown backward against the resiliency of the spring 35 the lever 15 will be disengaged from the hook 16 and the clutch-pulley 5 will be operated to bring the power-shaft to a state of rest.

It is very desirable in all automatic machinery to cause the machine to automatically stop in case of an accident or when there is an obstruction to the free and proper movements of any of the elements of the machine. In the present improvement for making sheet-metal chain the feed-finger 33 is constantly reciprocating to push successive blanks into proper position, and should any accident happen, so that there was the smallest deviation from the proper manipulating and shaping of the chain-links, the feed-finger would meet with an obstruction when it was operated to push the blank forward. Whenever such an obstruction is met with, my improved machine will automatically cease its operation, and I will now explain the particular means which I employ to effect this result.

As above stated, the feed-finger is adapted to slide within suitable ways in the bottom of the feed-block, while the trip-lever is pivoted on top of said block. In order to hold the finger so that it will not slide within the block during the ordinary operation of delivering the link-blanks to the chain-making instrumentalities, one side edge of said finger is recessed, as shown at 36, and a pin 37 depends from said trip-lever within this recessed portion of the finger. It will thus be understood that the ordinary work of feeding the link-blanks is not sufficient to overcome the power of the spring 35, and therefore said finger for all practical purposes will be held rigid with the feed-block; but should a link get twisted or displaced or any foreign substance interfere with the proper operation of the machine the forward movement of the feed-finger will be obstructed, and said finger will then slide backward in its ways in the feed-block, thus thrusting to one side the trip-lever 34 against the resiliency of the spring 35, thereby releasing the latch-lever 15 from the hook 16 and causing the machine to come to a state of rest.

The feed-finger 33 ordinarily reciprocates within a suitable feedway in the bed of the machine, the height of which feedway is only a trifle greater than the thickness of the blanks from which the chain is to be made, and when a stack of blanks is within the well 31 the lowermost blank will rest upon the floor of this feedway and the feed-finger will operate to push this lowermost blank forward and deliver the same to the link-forming instrumentalities. When the feed-finger has reached the limit of its forward movement in delivering the lowermost blank, as aforesaid, to the chain-forming instrumentalities, the stack of blanks will then be resting directly upon the surface of said finger, and when the latter is retracted the blank that is now the lowermost in the stack will drop within the feedway, so as to be in position to be pushed forward by the next forward movement of the feed-finger, and this operation is continued until the stack of blanks is exhausted.

38 is the mandrel-pin, which is adapted to slide freely within a vertical way in the forward end of a carriage 39, which latter has an arm 58 depending therefrom and passing beneath the shaft 2 and provided at its extremity with a roll $c$, which engages a cam 59 on said shaft, whereby reciprocatory movements may be imparted from said cam to said carriage, so that it will be clear that said pin will be carried bodily by said carriage during the reciprocatory movements of the latter.

40 is a bell-crank lever pivoted at its angle to a stationary part of the machine, the upper or short leg of said lever being provided with a roll 41 at its upper end, which engages a cam 42 on the power-shaft, while the lower or long leg of this lever is forked at its extremity, as shown at 43, and this forked portion loosely embraces a collar 44, extending laterally from the mandrel-pin and rigidly secured thereto. Secured in any suitable manner to the lower leg of the lever 40 is a hook or bracket 45, and 46 is a coil-spring whose ends are secured, respectively, to said fork and to a stationary part of the machine above the same, whereby the mandrel-pin is normally elevated and the roll 41 kept in engagement with the cam 42.

From the foregoing it will be readily understood that as the carriage 39 is projected and retracted the mandrel-pin will likewise be carried forward and backward, while said pin also is elevated and depressed by the action of the bell-crank lever, and it will also be noted that the open fork 43 will permit this projection and retraction of said carriage and mandrel.

As before stated, the link-blanks are in stacked form and are delivered one by one into the well 31, and although such blanks may be delivered in any suitable and ordinary manner I prefer to utilize certain means which I have devised, whereby as fast as one stack of links has been used up another stack will automatically take its place, and I will now describe this part of my invention.

Secured to the bed of the machine and rising therefrom is a frame 47, which supports an inclined track 48, at the lower end of which track is a slight ascent 49, which is provided near its top with a notch 50, beyond which notch the track is downwardly inclined and leads into a pocket 51.

52 is a keeper-bar secured in position immediately above the track and separated from the same at the ascent 49 by a predetermined space, said bar terminating short of the free end of the track.

The blanks are threaded upon parallel wires 53, the upper ends of which wires are secured to cross-blocks 54, and these cross-blocks rest upon the inclined track 48. When a cross-block is engaged with the notch 50 at the top of the ascent 49, the lower extremities of the wires carried by said block are immediately above the well 31, so that the links will readily drop from said wires within said well, while succeeding cross-blocks rest upon the inclined track 48, the bottom blanks of the stacks of blanks carried by the parallel wires depending from said succeeding cross-blocks resting at their extremities upon inclined parallel ways 55, that are secured to a stationary part of the machine, so that it will be clear that the blanks in succeeding stacks will not drop from the wires until they reach a position immediately above the well 31.

Within the block 56, which contains the well 31, are gates 57, immediately beyond said well, and when the blanks in a stack have dropped below the floors of these gates the wires which contained said blanks will swing through these gates, thereby releasing the cross-block from the notch 50, and a succeeding stack of blanks will swing forward into position, with the cross-block at the top engaging said notch and the free ends of the wires at the bottom immediately above the well 31, and the preceding block will thereby be forced beyond said notch and will slide downwardly into the pocket 51.

Referring to Fig. 2, the block and wires shown in solid lines and carrying no blanks are ready for removal, while the construction of block and wires shown in dotted lines denotes the position to which a block and wires will swing as soon as the blanks are dropped below the floors of the gates 57, and it will be clearly understood that the blanks themselves will prevent said wires from swinging to this dotted position until the blanks have dropped clear of the ends of the wires.

The lower or nose portion of the dog 29 is normally separated from the shaping-die 18 by a distance about equal to the width of the narrow portion of a link-blank, this position of the dog being maintained by means of any suitable stop (not shown) which limits the movements of said dog. The link-blanks at each end gradually taper toward the central portion, the latter being bounded by straight and parallel edges for a distance equal to about one-third of the length of the link-blank. The nose of the dog 29 is beveled on the side nearest to the stack of blanks, said bevel being continued at the front portion of said nose, so that when a blank is thrust forward by the feed-finger its wide end will initially strike against the nose of the dog and force the latter slightly to one side, the blank at the same time being momentarily turned on its axis by the action of the beveled nose of the dog. As the forward movement of the blank continues the gradually-decreasing width of said blank will come in contact with the beveled surface, and said blank will gradually assume a horizontal position again, and just before said blank is threaded through the eyes of a previously-bent link the narrowest or straight-edged middle portion of the blank will have come in contact with the nose of the dog, so that the blank will then be in a horizontal position and will not turn until after it has been threaded through the eyes of a previously partially formed link, owing to the fact that during this threading operation the beveled nose of the dog will be against the straight edge of the narrow portion of the blank. As the inclined side edges of the blank at the rear end thereof come in contact with the beveled nose of the dog after this threading operation the blank will thereby be turned on its axis, and the mandrel-pin 38 will then be moved forward, so as to bring said blank edgewise and snugly against the shaping-dies, as shown at Fig. 5.

The operation of my improvement in detail is as follows: Presupposing a blank to have been initially bent into U shape, as shown at Fig. 4, the feed-finger operates to feed a blank through the eyes of this previously-bent link, and as this feeding is being accomplished the beveled nose of the dog 29 will turn the blank after it has been threaded through the eyes of a previously partially formed link. The carriage 39 is now operated to advance the mandrel-pin 38, thus bringing the flat blank snugly against the shaping-dies and also forcing the loop of the previously-completed link through the space which separates the rear portions of the shaping-dies for the purpose of "upsetting" said link, this completed link during the operation of upsetting being supported on the upper face of the carriage 39. The shaping-dies are now closed, so as to shape the previously partially formed link around the mandrel-pin, as shown at Fig. 5, and the push-finger 26 is then advanced against the ends of this link, and the shaping-dies are spread apart, so that the continued advancing of said finger will force said link to the rear ends of said dies, the mandrel-pin meanwhile having been withdrawn from said link and retracted, said continued advancement of the push-finger also effecting the initial U-bending of the flat blank which hitherto had been snugly against the shaping-dies. The push-finger is then retracted and the mandrel-pin projected upward within the U bend of this last-named previously partially formed link, the parts at this time being in the position as shown at Fig. 4, in which position a succeeding flat blank is threaded by the action of the feed-finger through the eyes of this previously partially formed link, the operations of the various parts, as above described, being now repeated, and so on.

The rear portions of the shaping-dies above referred to are when said dies are fully distended normally separated by a space which is less than the outside diameter of the loop end of a link prior to the "upsetting" operation, and the mandrel-pin 38 is notched in the side, as shown, so that the two ends of a link may snugly fit within said notch, as shown at Figs. 4 and 5. It will therefore be clear that after the shaping-dies have been spread and the mandrel-pin advanced, as above set forth, the ends of the link will be held by the mandrel-pin as against spreading or in any way shifting, and as the sides of the loop of the link are forced against the rear portions of the shaping-dies by this advancing of the mandrel-pin the link will be cramped lengthwise, and the loops themselves will be slightly flattened or elongated as they are forced completely through these rear portions of the shaping-dies. This upsetting of the links is necessary in order to "set" the ends of the link closer together, so that there will be no tendency to spring apart.

It will be observed that the mandrel-pin has four motions, which are all independent of the motions of the carriage which controls the operations of the push-finger, this being due to the fact that the movements of the push-finger and pin are controlled by independent and separate cams, and this is obviously a great advantage, since if the push-finger and mandrel-pin were controlled by the operation of one carriage from a single cam too much work would be thrown upon such carriage and cam, and the machine would be more likely to get out of order.

I do not wish to be limited to the employment of any means for properly holding and guiding a series of stacks of link-blanks, since it will be clear that a single stack of such blanks may be sustained in proper position for delivering the blanks to the feed-well.

Having thus described my invention, what I claim as new, and desire to secure by Letters Patent, is—

1. In a machine for automatically making sheet-metal chain, the combination of means for holding a stack of blanks, a feed-well into which said blanks are delivered, a reciprocatory feed-finger whereby said blanks are successively fed forward and threaded through the eyes of previously-bent blanks, a pair of shaping-dies, means for operating said dies, the mandrel-pin, means for carrying said pin forward and backward, means for elevating and depressing said pin at the ends of said forward and backward movements respectively, the resilient dog having a beveled nose and normally projected into the feedway of the blanks, and the reciprocatory push-finger, substantially as and for the purpose specified.

2. In a machine for automatically making sheet-metal chain, the combination of means for delivering the blanks to the feed-finger, means for initially bending the blanks into U shape, the reciprocatory feed-finger for threading the blanks through the eyes of previously-bent blanks, and the resilient beveled-nosed dog normally projected in the path of the blanks as they are acted upon by said finger whereby said blanks will be automatically turned edgewise and firmly held in this position, substantially as set forth.

3. In a machine for automatically making sheet-metal chain, the combination of the reciprocatory shaping-dies, means for feeding and means for turning the link-blanks into proper position with respect to said dies, the mandrel-pin for bending the blank into U shape between said dies, means for giving the mandrel-pin four motions whereby said pin is elevated within the bend of an initially-bent blank and then advanced to bring said blank in proper position preparatory to the action of the shaping-dies to effect the upsetting of the previously-completed link and then withdrawn from the link after the effective action of the shaping-dies and retracted to normal position, substantially as set forth.

4. In a machine for automatically making sheet-metal chain, the combination of the power-pulley, the clutch, the spring-actuated clutch-lever, means for latching the same in effective position, the reciprocatory feed-block, the feed-finger carried by said block and capable of a sliding movement therein, and means interposed between said finger and latching means whereby an obstruction to the free movement of said finger will automatically release the latch and effect the stopping of the machine, substantially as set forth.

5. In a machine for automatically making sheet-metal chain, the combination of the power-pulley, the clutch, the clutch-lever, a spring for normally throwing said lever out of effective position, a latch-lever pivoted to the clutch-lever, a stationary hook, a spring connected to said lever whereby the latch-lever will be kept normally in engagement with said hook, the reciprocatory feed-block, the feed-finger capable of sliding in ways in said block, the trip-lever pivoted to said block, and extending immediately in front of said latch-lever, the spring secured to the feed-block and bearing against the trip-lever whereby the latter is held in normal position, and a frictional connection between said trip-lever and feed-finger whereby any undue opposition to the free movement of the latter will cause said trip-lever to effect the automatic stopping of the machine, substantially as set forth.

6. In a machine for automatically making sheet-metal chain, the combination of the power-pulley, the clutch, the lever which controls the clutch, devices for holding said lever in effective position, the feed-block, the feed-finger carried by said block and capable of a sliding movement therein, and a resiliently-acting lever pivoted to said block and normally interposing a predetermined resistance to the sliding movements of the feed-finger relatively to said block and also extending in proximity to the devices for holding the clutch-lever in effective position, whereby extraordinary opposition to the free movement of said feed-finger will release said holding device and effect the automatic stopping of the machine, substantially as set forth.

7. The combination of the block having therein the feed-well and provided with gates in its upper edge, the elevated inclined track having an ascent at the base of said inclination, said ascent terminating in a notch at its upper end, the keeper-bar above said track, and the parallel inclined stationary ways leading into said well, substantially as set forth.

In testimony whereof I affix my signature in presence of two witnesses.

FREDERICK EGGE.

Witnesses:
F. W. SMITH, Jr.,
M. T. LONGDEN.